United States Patent
Tuganbaev et al.

(10) Patent No.: US 9,390,321 B2
(45) Date of Patent: Jul. 12, 2016

(54) FLEXIBLE STRUCTURE DESCRIPTIONS FOR MULTI-PAGE DOCUMENTS

(75) Inventors: Diar Tuganbaev, Moscow (RU); Marinos Dimostheons, legal representative, Moscow (RU); Sergey Zlobin, g. Reutov (RU); Irina Filimonova, Moscow (RU)

(73) Assignee: ABBYY Development LLC (RU)

( * ) Notice: Subject to any disclaimer, the term of this patent is extended or adjusted under 35 U.S.C. 154(b) by 1227 days.

(21) Appl. No.: 13/242,653

(22) Filed: Sep. 23, 2011

(65) Prior Publication Data

US 2012/0243055 A1    Sep. 27, 2012

Related U.S. Application Data

(63) Continuation-in-part of application No. 12/206,067, filed on Sep. 8, 2008, now Pat. No. 8,290,272, and a continuation-in-part of application No. 12/470,425, filed on May 21, 2009, now Pat. No. 8,547,589.

(51) Int. Cl.
    *G06K 9/00*    (2006.01)
    *H04N 1/32*    (2006.01)
    *H04N 1/00*    (2006.01)

(52) U.S. Cl.
    CPC ........ *G06K 9/00449* (2013.01); *G06K 9/00483* (2013.01); *H04N 1/00803* (2013.01); *H04N 1/32128* (2013.01)

(58) Field of Classification Search
    None
    See application file for complete search history.

(56) References Cited

U.S. PATENT DOCUMENTS

| | | |
|---|---|---|
| 4,996,665 A | 2/1991 | Nomura |
| 5,197,121 A | 3/1993 | Miyoshi et al. |
| 5,317,646 A | 5/1994 | Sang, Jr. et al. |
| 5,339,412 A | 8/1994 | Fueki |
| 5,422,743 A | 6/1995 | Farrell et al. |
| 5,428,694 A | 6/1995 | Betts et al. |
| 5,434,962 A | 7/1995 | Kyojima et al. |
| 5,459,827 A | 10/1995 | Allouche et al. |
| 5,555,101 A | 9/1996 | Larson et al. |
| 5,555,362 A | 9/1996 | Yamashita et al. |
| 5,633,996 A | 5/1997 | Hayashi et al. |
| 5,701,500 A | 12/1997 | Ikeo et al. |
| 5,727,220 A | 3/1998 | Hohensee et al. |

(Continued)

FOREIGN PATENT DOCUMENTS

| | | |
|---|---|---|
| JP | 11224346 A | 8/1999 |
| JP | 2004355528 A | 12/2004 |

*Primary Examiner* — Nicholas Pachol
*Assistant Examiner* — Lennin Rodriguezgonzale
(74) *Attorney, Agent, or Firm* — LeighAnn Weiland; Veronica Weinstein

(57) ABSTRACT

A method for processing a batch of scanned images is provided. The method comprises processing the scanned images into documents. For documents of multiple pages, the method comprises maintaining a page-based coordinate system to specify a location of structures within a page and joining the pages to form a multi-page sheet having a sheet-based coordinate system to specify a location of structures within the multi-page sheet. The method comprises performing a data extraction operation to extract data from each document, said data extraction operation including a page mode wherein structures are detected on individual pages using the page-based coordinate system and a document mode wherein structures are detected within the entire document using the sheet-based coordinate system.

17 Claims, 6 Drawing Sheets

(56) References Cited

U.S. PATENT DOCUMENTS

| | | |
|---|---|---|
| 5,822,454 A | 10/1998 | Rangarajan |
| 5,848,184 A | 12/1998 | Taylor et al. |
| 5,848,186 A | 12/1998 | Wang et al. |
| 5,999,664 A | 12/1999 | Mahoney et al. |
| 6,002,798 A | 12/1999 | Palmer et al. |
| 6,400,845 B1 | 6/2002 | Volino |
| 6,456,738 B1 | 9/2002 | Tsukasa |
| 6,562,077 B2 | 5/2003 | Bobrow et al. |
| 6,941,521 B2 | 9/2005 | Lin et al. |
| 7,028,250 B2 | 4/2006 | Ukrainczyk et al. |
| 7,069,501 B2 | 6/2006 | Kunitake et al. |
| 7,149,347 B1 | 12/2006 | Wnek |
| 7,171,615 B2 | 1/2007 | Jensen et al. |
| 7,310,635 B2 | 12/2007 | Tucker |
| 7,346,215 B2 | 3/2008 | Shih et al. |
| 7,383,496 B2 | 6/2008 | Fukuda |
| 7,529,408 B2 | 5/2009 | Vohariwatt et al. |
| 7,653,921 B2 | 1/2010 | Herley |
| 7,761,787 B2 | 7/2010 | Singleton et al. |
| 8,056,001 B2 | 11/2011 | Chao |
| 8,064,096 B2 | 11/2011 | Waara |
| 2002/0029232 A1 | 3/2002 | Bobrow et al. |
| 2002/0064316 A1 | 5/2002 | Takaoka |
| 2004/0153465 A1 | 8/2004 | Singleton et al. |
| 2005/0067482 A1 | 3/2005 | Wu et al. |
| 2007/0133067 A1 | 6/2007 | Garg |
| 2007/0168382 A1 | 7/2007 | Tillberg et al. |
| 2008/0025608 A1* | 1/2008 | Meunier ............... 382/181 |
| 2008/0170786 A1 | 7/2008 | Tomizawa et al. |
| 2008/0195968 A1 | 8/2008 | Schacht |
| 2009/0028437 A1 | 1/2009 | Hirohata |
| 2009/0074296 A1 | 3/2009 | Filimonova et al. |
| 2009/0216794 A1 | 8/2009 | Saptharishi |

* cited by examiner

400

| Subj | Course Title | Lecturer | DOW | Time | Room |
|------|--------------|----------|-----|------|------|
| Autumn 2007 | | | | | |
| ENG | Rhetoric and Elocution | J. Wilson | mo | 9:00 am | 212 |
| SOC | General Sociology | R. Mitchell | mo | 11:00 am | 305 |
| MAT | Systems of EQ | N. Cooper | mo | 2:00 pm | 203 |
| MAT | Mathematical Analysis | M. Nielsen | tu | 11:00 am | 205 |
| HIS | Contemporary History | N. Davis | tu | 2:00 pm | 419 |
| ENG | Research and College Writing | F. Oneil | we | 9:00 am | 123 |
| GOV | International Politics | L. Dowling | we | 2:00 pm | 432 |
| LAN | Foreign Language | Elective | we | 4:00 pm | 6th floor |
| MAT | Mathematical Analysis | N. Davis | th | 9:00 am | 203 |
| ENG | Orthography and Spelling | B. Joyner | th | 11:00 am | 113 |
| BIO | Principles of Biology | S. Hill | th | 2:00 pm | 316 |
| PHL | Antique Philosophy | M. McKay | fr | 11:00 am | 110 |
| PHS | General Physics | T. Jones | fr | 2:00 pm | 507 |
| MAT | Polynomials and Approximation | A. Green | fr | 4:00 pm | 239 |
| Winter 2007 | | | | | |
| ENG | Orthography and Spelling | B. Joyner | mo | 11:00 am | 118 |
| PHL | History of Philosophy | T. Hubbard | mo | 2:00 pm | 115 |
| MAT | Graphing | J. Curtis | mo | 4:00 pm | 231 |
| BIO | Environmental Biology | E. Salazar | tu | 9:00 am | 303 |
| SOC | General Sociology | R. Mitchell | tu | 11:00 am | 305 |
| LAN | Foreign Language | Elective | tu | 2:00 pm | 6th floor |
| PHS | General Physics | S. Dixon | we | 9:00 am | 504 |
| PHS | General Physics | S. Dixon | we | 11:00 pm | 504 |
| HIS | Contemporary History | G. Smith | we | 2:00 pm | 406 |
| GOV | International Politics | R. Stone | th | 9:00 am | 203 |

| Subj | Course Title | Lecturer | DOW | Time | Room |
|---|---|---|---|---|---|
| MAT | Principles of Logic | L. Palmer | th | 11:00 am | 216 |
| ENG | Research and College Writing | F. Oneil | fr | 11:00 am | 112 |
| MAT | Mathematical Analysis | N. Davis | fr | 2:00 pm | 203 |
| SOC | Social Psychology | D. Barrera | fr | 4:00 pm | 329 |

Spring 2008

| Subj | Course Title | Lecturer | DOW | Time | Room |
|---|---|---|---|---|---|
| LAN | Foreign Language | Elective | mo | 9:00 am | 6th floor |
| BIO | Environmental Biology | E. Salazar | mo | 11:00 am | 303 |
| HIS | American History | W. Travis | tu | 9:00 pm | 417 |
| HIS | American History | W. Travis | tu | 11:00 am | 417 |
| MAT | Principles of Logic | L. Palmer | tu | 4:00 pm | 216 |
| PHS | General Physics | S. Dixon | we | 9:00 am | 510 |
| ENG | Rhetoric and Elocution | H. Cote | we | 11:00 am | 124 |
| PHL | History of Philosophy | T. Hubbard | we | 2:00 pm | 106 |
| GOV | International Politics | R. Stone | th | 9:00 am | 203 |
| ENG | Orthography and Spelling | A. Springer | th | 11:00 am | 118 |
| SOC | Social Psychology | D. Barrera | th | 2:00 pm | 326 |
| MAT | Mathematical Analysis | N. Davis | fr | 11:00 am | 204 |
| MAT | Systems of EQ | P. Yang | fr | 2:00 pm | 207 |

*FIG. 4B*

FLEXIBLE STRUCTURE DESCRIPTIONS FOR MULTI-PAGE DOCUMENTS

CROSS-REFERENCE TO RELATED APPLICATIONS

For purposes of the USPTO extra-statutory requirements, the present application constitutes a continuation-in-part of U.S. patent application Ser. No. 12/206,067 that was filed on 8 Sep. 2008 now U.S. Pat. No. 8,290,272, or is an application of which a currently co-pending application is entitled to the benefit of the filing date. The contents of application Ser. No. 12/206,067 are hereby incorporated by reference in so far as application Ser. No. 12/206,067 is not inconsistent with the disclosure herein. The present application also constitutes a continuation-in-part of U.S. patent application Ser. No. 12/470,425 that was filed on 21 May 2009 now U.S. Pat. No. 8,547,589.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

The present invention relates generally to implementations of methods, systems and devices for creating a document structure description for capturing data from a document image, and methods, systems and devices for capturing data from a document image.

BACKGROUND

Typically, data from paper documents are captured into a computer database by a data capture system, which converts paper documents into electronic form (by scanning or photographing documents) and then extracts data from document fields within the document.

Many documents, for example, phone bills, invoices and registration forms, are multi-page documents in that they have more than one page. An example of a multi-page document is shown in FIG. 4A and FIG. 4B. Often information contained in multi-page documents includes multiple groups of data having identical structures. For example, each group of fields may have a subheading, a table fragment, a subtotal, or a caption for the table fragment. The number and size of groups may vary from document to document of a given type and, consequently, the number of pages may also vary.

Sometimes, multi-page paper documents are immediately converted into multi-page electronic documents (e.g., portable document format (PDF) and tagged image file format (TIFF) files), in which case a data capture system is often required to know in advance the pages that comprise the multi-page document. In other cases, documents are scanned page by page and appear as a sequence of individual images in the document capture system. Page by page feeding is time consuming and error prone. Sometimes separator pages are used to separate one document from another. In such cases, pages from a single document may be placed into a separate electronic document. In still other cases, documents of different types may be scanned, one immediately after another, without any special separators. In these cases, separate paper documents may be erroneously end up in a single electronic document. Therefore, in the general case, to capture data from a multi-page document, it is necessary to identify page images that all belong to a single document of certain type and then detect and extract the relevant data from the data fields. These and other shortcomings of the current art are overcome by use of the teachings described herein.

SUMMARY OF THE INVENTION

In an exemplary embodiment, a method enables capturing, through a data capture system, of data from a document image corresponding to a paper document. The method comprises defining a flexible structure description for the document, the flexible structure description comprising descriptions of structures in the document and detection information to facilitate detection of said structures in the document image. Detection information specifies whether a structure is to be detected with reference to its placement within a page of the document, or with reference to its placement within the document as a whole. Detection information provisions a data capture system with a flexible structure description.

In other exemplary embodiments, a method facilitates processing of a batch of scanned images. The method comprises processing the scanned images into documents. For documents comprising multiple pages, the method also comprises maintaining a page-based coordinate system to specify a location of structures within a page and joining the pages to form a multi-page sheet having a sheet-based coordinate system to specify a location of structures within the multi-page sheet. The method further comprises performing a data extraction operation to extract data from each document, said data extraction operation comprising a page mode wherein structures are detected on individual pages using the page-based coordinate system and a document mode wherein structures are detected within the entire document using the sheet-based coordinate system.

BRIEF DESCRIPTION OF THE DRAWINGS

FIG. 4A and FIG. 4B show schematic views of a sample multipage document with run-on fields and subheadings.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 5:
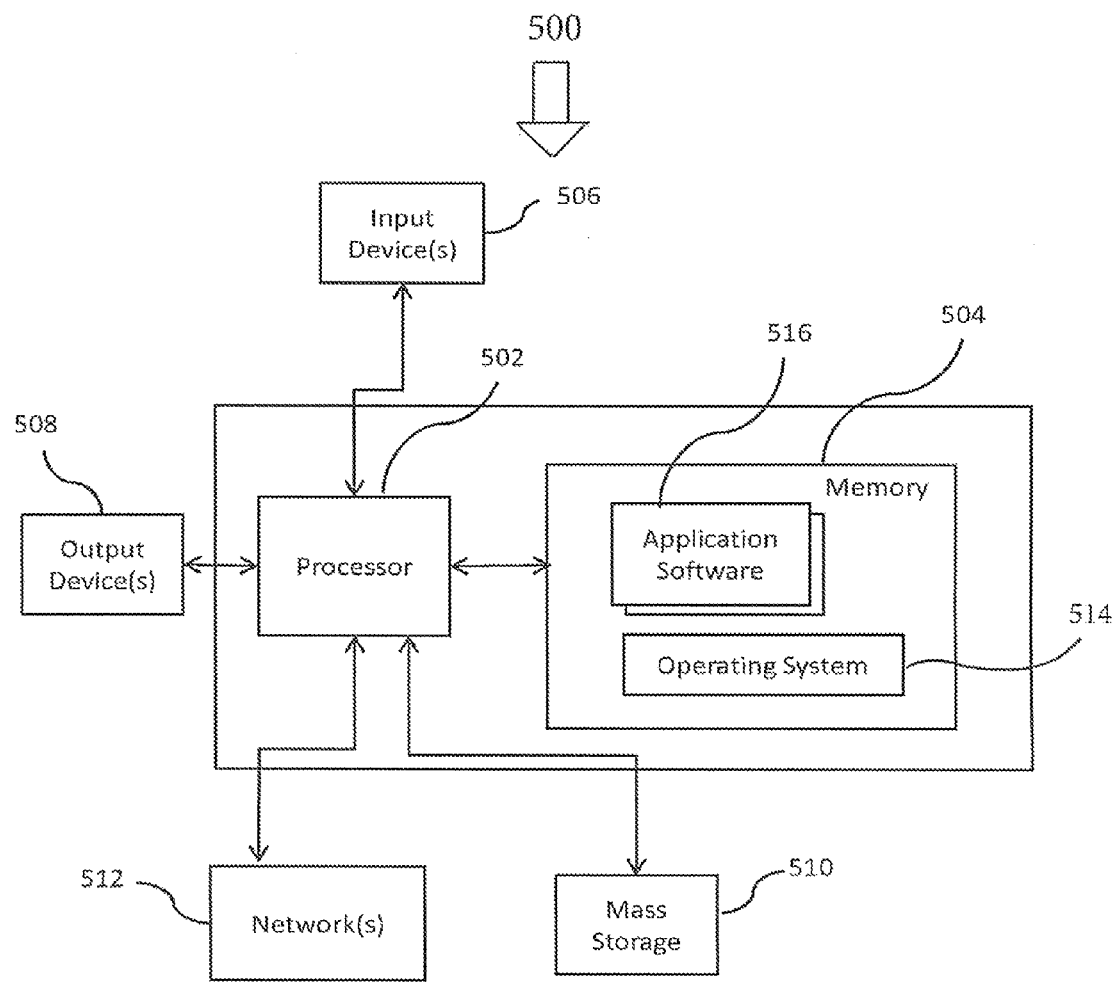
FIG. 5 shows a block diagram of a data capture system, in accordance with one embodiment of the invention.

In accordance with one embodiment of the invention, there is provided a process for creating a flexible structure description of a multi-page document. The process is performed by a data capture system such as a document scanner, or by a document scanner and one or more related components including software, firmware or hardware. Exemplary hardware corresponding to a data capture device or system for performing the process is illustrated in FIG. 5, and is further described herein.

Figure 1:
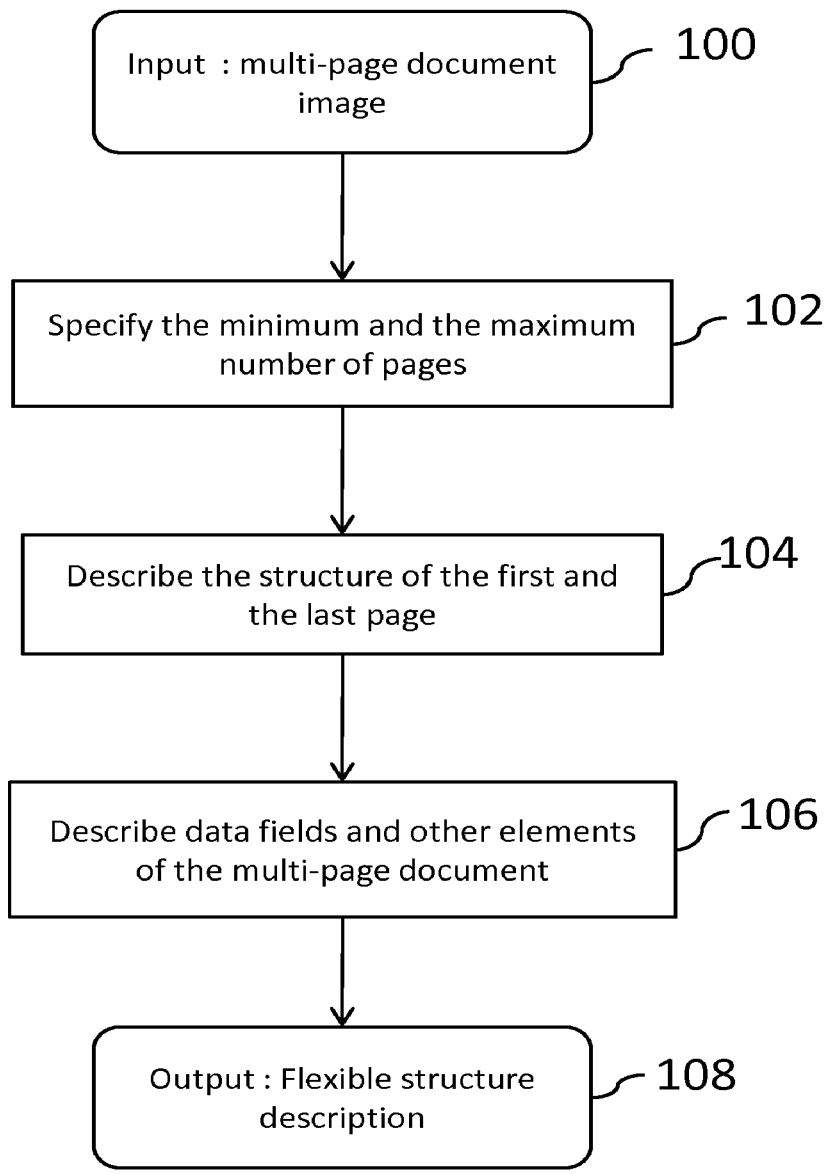
FIG. 1 shows a flowchart of a method for creating a structure description of a multi-page document, in accordance with one embodiment of the invention.

One embodiment of the process for creating a flexible structure description is illustrated by the flowchart of FIG. 1 where the multi-page document or document image is indicated as an input with reference numeral 100.

Specially prepared flexible structure descriptions are used to capture data from paper documents. A flexible structure description comprises elements and relationships between the elements. A data field is a type of element that identifies an area on the image from which data are to be extracted and the type of data that this area may contain. The positions of the fields are usually detected based on reference elements, or anchors. An anchor corresponds to one or more predefined image elements (e.g., separator line, unchangeable text, picture) relative to which the positions of other elements are specified. A flexible structure description may also comprise an algorithm for detecting fields on semi-structured documents. Flexible structure descriptions may be created by human experts and are loaded into a data capture system to be automatically matched against incoming documents.

Referring to FIG. 1, at block 102 a minimum and maximum number of pages for a document of a given document type is specified. In one embodiment, the minimum number of pages in a flexible structure description may be set to 1, as a brief document may well fit into one page. But the data capture system may also be fed documents which contain more than one page or which always contain a certain number of pages. To cover that latter case, in one embodiment, the likely number of pages for a document type is specified in its flexible structure description to help the data capture system to identify the required document faster and more reliably in the batch of incoming page images. In some embodiments a maximum number of pages for a given document type may also be specified. This number may be set to be greater than the actual maximum number of pages observed corresponding to the document type based on examining a number of document samples of the given type.

In one embodiment, in order to enable the data capture system to identify a document automatically, at block 104 special sections may be created in the flexible structure description which describe the structure of a first (e.g., header) page and a last (e.g., footer) page of the document. Either or both of these sections may occur in a flexible structure description only once. In one embodiment, each of these sections is a complete structure description in its own right which describes anchor elements, fields, image objects, spatial relationships among elements, possible search areas, possible data types, etc.

Generally, a header section describes the structure elements of the document's title, whereas a footer section describes the structure elements of the final part of the document. In the case of a one-page document, the header and footer sections may be located on the same page.

Besides the header and footer sections, a structure description for a multi-page document may include descriptions of some or all data fields to be detected and of some or all anchor elements and their relationships within the structure of documents of the given type. These descriptions are created at block 106. In one embodiment, when describing individual elements, a range of pages may be specified on which the given element may occur. For example, the structure description may specify that a table element may be found on any page except page 1, or that a Total Amount element may be found on the last page or on the last page minus one. In the general case, any element may be placed on any page of the document, and its actual position may be determined by its relation to other elements in the document structure expressed as, for example, "above," "below," "left of," and "right of" and by offsets relative to element boundaries.

A multi-page document may often contain repeating groups of fields. As an example, consider the document 400 shown in FIG. 4A and FIG. 4B, where "Subj", "Course Title", "Lecturer", "DOW", "Time", and "Room" fields define a repeating group of fields across a series of rows. Depending on the type of document, such groups may be placed differently across pages. Sometimes, a single page will contain one or more instances of a repeating group in its entirety. In other documents, an instance of a repeating group may flow over from one page onto a next page, with some fields of the instance placed on one page and the others placed on the next (this type of repeating group is termed herein a "run-on" group). For the former case, and in one embodiment, the process 106 specifies that groups should be detected on individual pages ("page mode"), whereas and for the latter case, the process 106 specifies that groups are to be detected in the entire document ("document mode"). In one embodiment, for each repeating group of elements, the process 106 specifies a minimum and a maximum possible number of instances. In document mode, the number of possible instances may be specified for the entire document, and in page mode the number of possible instances may be specified for individual pages.

Additionally, in one embodiment, the process 106 specifies a condition for searching the next instance relative to the previously detected instance. The condition may be specified as a combination of search direction (by choosing from, for example, four options: "above," "below," "left of," and "right of"), the boundary of the instance relative to which the search direction is specified, and an offset of the search area relative to the boundary.

At block 108, the flexible structure descriptions of multi-page documents of different types are output such as to a memory or to a file or part of a file. These structure descriptions are used by the data capture system to identify documents in a batch of incoming page images, to detect the relevant data fields, and extract the data contained in the data fields, as will now be described.

Figure 2:
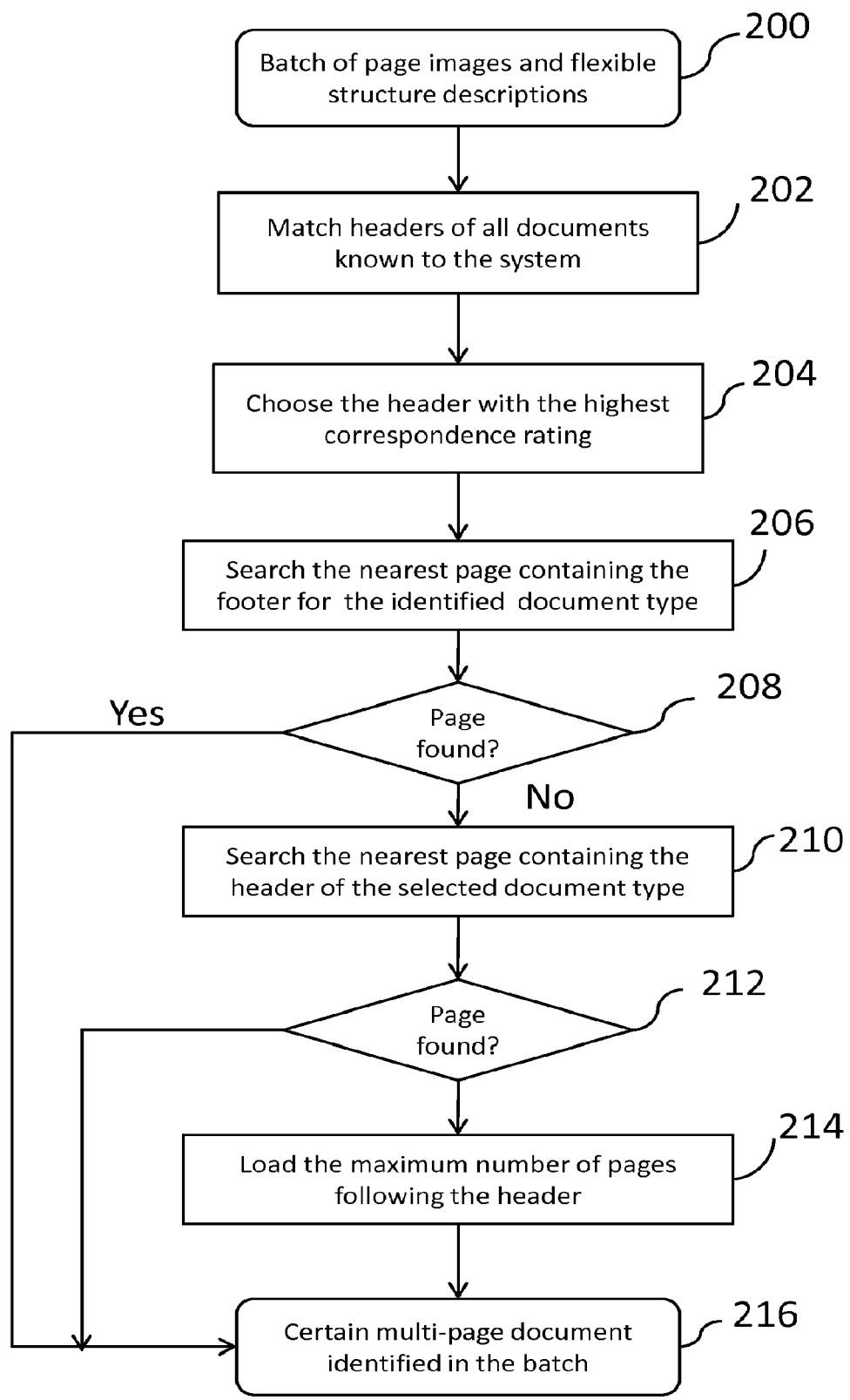
FIG. 2 shows a flowchart of a method for finding an individual document in a batch of various multi-page documents; in accordance with one embodiment of the invention.

Referring now to FIG. 2, there is shown a process for identifying a document in accordance with one embodiment of the invention. The process may be typically performed by a data capture system such as the one shown in FIG. 5. The process may begin at block 200 where a batch of page images is input into the data capture system. For example, these images are loaded into a memory of computer system. At block 202, each incoming page image is examined assuming that it is the first (header) page of one of the document types known to the system. In the process, the header section of each structure description is matched against each incoming page image (202). The quality of the matching is rated on a scale of 0 to 1, where 0 means zero correspondence and 1 means 100% correspondence. If none of the headers match the given page (i.e., if none of the matches has received a rating >0), the next incoming page image is examined working on the assumption that it is the first page of the document. If several headers of different document types match a certain page, preference is given to the document type whose header has received the highest correspondence rating. Thus, at block 204 the beginning of the document is detected and its type is identified. If the structure description does not contain a header section, the entire structure description is used to identify the type of a document.

Once the document type is identified and its first page is detected, the last page of the document is detected. This is done at block 206 where a search is performed for the nearest page containing the footer for the identified document type. If the exact number of pages in a document is specified (e.g., the minimum number of pages equals the maximum number of pages), the system will treat the specified number of pages following the detected first page as one document. Document boundaries may also be specified explicitly by using special separator pages or by scanning pages into a multi-page image file.

If the end of the document is not explicitly specified, the system will consider all pages starting from the first one as possible candidates for the end of the document. To detect the last page of the document, the system matches the footer section of the document of the selected or identified type against each page. The first page for which the footer correspondence rating is greater than zero is considered to be the last page of the document. Thus, the last page is considered found at block 208 and processing moves to block 216 where the document itself is considered identified in the batch of page images.

If the system has examined the maximum number of pages allowed by the structure descriptions and the footer section has not matched any of them, the system will attempt to match the pages with headers of all document types known to it at block 210. A detected header of a different document type enables the system to consider the previous page as the last page of the document to be identified. If the system fails to detect the last page using the header and footer sections of the known document types, the system assumes that the number of pages in the document equals the maximum number of possible pages specified in its structure description. Thus, to identify the multi-page document in the batch of incoming page images the system loads the maximum allowed number of pages after the header at block 214.

Figure 3:
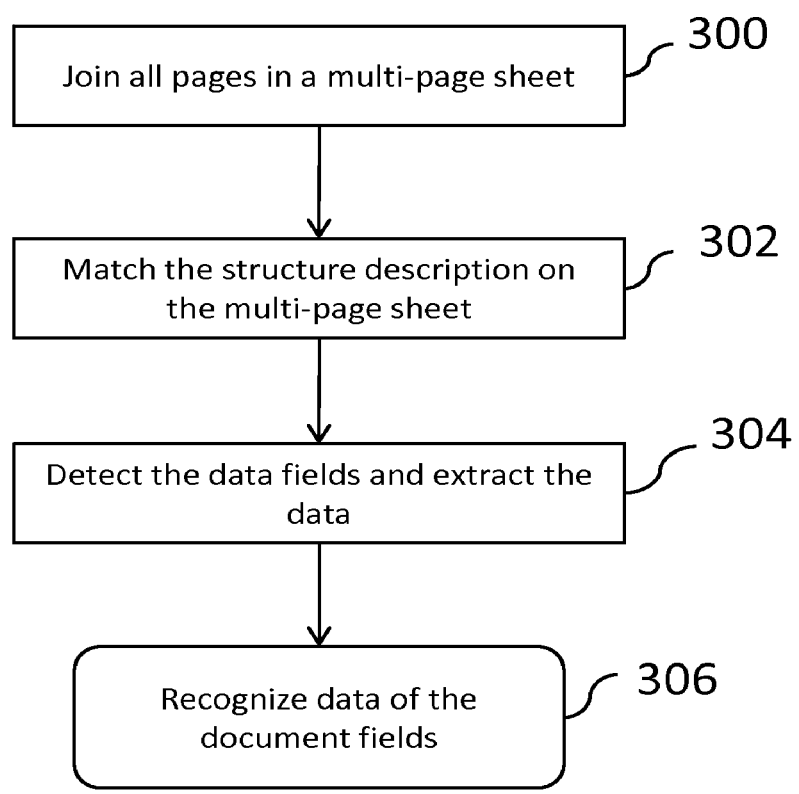
FIG. 3 shows a flowchart of a method for extracting data from fields on a document of a certain type, in accordance with one embodiment of the invention.

FIG. 3 shows an exemplary process of extracting data from data fields in a scanned image, in accordance with one embodiment. The process of FIG. 3 is executed after the identification process shown in FIG. 2. The multitude of pages of a document is termed a multi-page sheet. A multi-page sheet is obtained by merging or joining together the pages of the document—top down—at block 300 without any joints or gaps, and the left edges of all the pages are placed on the same axis that goes through the point (0,0). The sequence of the pages in the sheet depends on their order in the batch.

Two coordinate systems are used: a global system of coordinates (goes through or works for the entire document) and a local system of coordinates (bound to a particular page). One difference between the global and local coordinate systems is that the global system has parallel shifts, each page having its own shift.

Example

Let there be 3 pages in a document having the following sizes: 2500×3500, 2400×3400, and 2300×3300. Then the global coordinates of the pages are: [0, 0, 2500, 3500], [0, 3500, 2400, 6900], [0, 6900, 2300, 10200] (in the order [left, top, right, bottom]). For relations between elements, the global coordinate system is used, so that the relations, such as BELOW, are interpreted correctly.

Once the page images are joined into one multi-page sheet at block 300, the flexible structure description is applied to the entire sheet at block 302 as if it were an image of a page. Next, the system tries to detect the data fields and extract the data at block 304. At block 306, a recognition technique (e.g., optical character recognition (OCR)) may be used to recognize the data extracted from the fields.

When matching repeating groups against a multi-page sheet, the system takes into account the possible locations of group instances, both on individual pages and in the document as a whole. During the search, the regions of already detected group instances are removed from the search area of the next instances so that the different instances of one and the same group do not overlap. At the same time the rectangles enclosing group instances may overlap. The search for instances of a repeating group is deemed complete when the system cannot find any of the elements of the group in the search area of the next instance.

The use of a multi-page sheet (global coordinate system) together with the images of individual pages (local coordinate system) makes it possible to solve tasks as complex as capturing data from documents with multi-page tables as is the case with the document 400 of FIG. 4A and FIG. 4B. Very often on each page of a document there is a running title at the top and/or at the bottom, with a table flowing over from one page to the next. In this case, the running title interrupts the data contained in the table. Describing the running title as a repeating group which occurs once on each page enables the system to detect it and remove it from the table search area. The information about the number, make-up, and order of columns in the table is used by the system when going from one page to the next.

Additionally, the concept of multi-page sheet enables the system to capture data from run-on tables with complex row structures. For example, a row may contain merged cells or may be located on more than one line (this is typical of wide tables where all columns do not fit on one line and are carried over to the next line) and flow over onto the next page. If this is the case, the row is described as a repeating group, which could be detected in a document mode.

FIG. 5 shows an example of a data capture device or system 500. The system 500 may include at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g., programmable or flash memories), read-only memories, etc. In addition, the memory 504 may be considered to include memory storage physically located elsewhere in the system 500, e.g., any cache memory in the processor 502 as well as any storage capacity used as a virtual memory, e.g., as stored on a mass storage device 510.

The system 500 also may receive a number of inputs and outputs for communicating information externally. For interface with a user or operator, the system 500 may include one or more user input devices 506 (e.g., a keyboard, a mouse, imaging device) and one or more output devices 508 (e.g., a liquid crystal display (LCD) panel, a sound playback device (speaker, headphones)).

For additional storage, the system 500 may also include one or more mass storage devices 510, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 may include suitable analog and/or digital interfaces between the processor 502 and each of the components 504, 506, 508, and 512 as is well known in the art.

The system 500 operates under the control of an operating system 514, and executes various computer software applications, components, programs, objects, modules, etc., to implement the techniques described above. Moreover, various applications, components, programs, objects, etc., collectively indicated by reference 516 in FIG. 5, may also execute on one or more processors in another computer coupled to the system 500 via a network 512, e.g., in a distributed computing environment, whereby the processing required to implement the functions of a computer program may be allocated to multiple computers over a network. The application software 516 may include a set of instructions which, when executed by the processor 502, causes the system 500 to implement the method described above.

In general, the routines executed to implement the embodiments of the invention may be implemented as part of an operating system or a specific application, component, program, object, module or sequence of instructions referred to as "computer programs." The computer programs may comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs)).

While certain exemplary embodiments have been described and shown in the accompanying figures, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure. It is intended that the appended claims be construed to include alternate implementations to the extent permitted.

We claim:

1. A method for enabling a data capture system to capture data from a multi-page document image corresponding to a multi-page document, the method comprising:
    defining a flexible structure description for the multi-page document, the flexible structure description comprising descriptions of structures in the multi-page document and detection information to facilitate detection of said structures in the multi-page document image,
    wherein at least one description of structure has detection information specifying that the structure is to be detected with reference to its placement within the multi-page document as a whole,
    wherein defining the flexible structure description for the multi-page document includes providing header information of a header, and wherein the method further comprises:
    searching each page image of the multi-page document image until a header section meeting or exceeding a matching rating corresponding to the header information is found;
    when no header section meeting or exceeding a matching rating corresponding to the header information is found, identifying a document type based in part on a document structure description; and
    when several headers of different document types match a page image, selecting the document type whose header information received a highest correspondence rating; and
    provisioning a data capture system with the flexible structure description.

2. The method of claim 1, wherein the flexible structure description comprises a minimum number of instances of a structure.

3. The method of claim 1, wherein the flexible structure description comprises a maximum number of instances of a structure.

4. The method of claim 2, wherein the instances are specified on a per page basis or on a per document basis.

5. The method of claim 1, wherein for a structure that spans more than one page, header information associated with the structure is described on a per page basis as a repetitive field in the flexible structure description.

6. The method of claim 1, wherein for a data field that spans several rows, said data field is represented as a repetitive field on a per document basis.

7. The method of claim 1, wherein the flexible structure description further comprises an algorithm for detecting fields in the multi-page document image, and wherein the method further comprises creating a multi-page sheet image by joining a plurality of page images to create the multi-page document image, wherein a left edge of each of the page images is placed on a same axis.

8. The method of claim 1, wherein the flexible structure description further comprises a description for a run-on group, wherein the run-on group includes information regarding repeating groups of fields, wherein a run-on group flows from a first page onto a next page with some fields of an instance of the run-on group placed on the first page and the other fields of the run-on group placed on one or more next pages.

9. The method of claim 1, wherein the flexible structure description further comprises a description for instances of a group defined for individual page images ("page mode") and a description for instances of a group defined for the multi-page document image ("document mode").

10. The method of claim 1, wherein the multi-page document image includes multi-page document images of a batch of scanned multi-page document images, and wherein the method further comprises identifying an individual multi-page document based at least in part upon the header section meeting or exceeding the matching rating corresponding to the header information.

11. The method of claim 1, wherein defining the flexible structure description for the multi-page document includes defining a global system of coordinates for the multi-page document image and a local system of coordinates for image pages of the multi-page document image, wherein the global system includes one or more parallel shifts, and wherein each page includes a page shift.

12. A data capture system comprising:
   a memory to store at least one flexible structure description, each corresponding to a multi-page document, said at least one flexible structure description each comprising:
      descriptions of structures in the multi-page document and detection information to facilitate detection of said structures in a multi-page document image corresponding to the multi-page document,
      wherein at least one description of structure has detection information specifying that the structure is to be detected with reference to its placement within the multi-page document as a whole; and
   a processor to process scanned multi-page documents based on each flexible structure description, wherein the scanned multi-page documents are in a single document image, and wherein to process the scanned multi-page documents based on each flexible structure description includes:
      detecting a header of a different document type on a page image;
      identifying a previous page to the page image of the detected header as a last page of the multi-page document to be identified;
      when the data capture system fails to detect the last page using the header of the different document type, using a maximum number of possible pages specified in the respective flexible structure description to identify the previous page.

13. The data capture system of claim 12, further comprising a scanner to acquire the scanned multi-page documents.

14. The data capture system of claim 12, wherein a structure that spans more than one page image, the flexible structure description includes header information associated with the structure, the header information being described on a per page basis as a repetitive field in the flexible structure description.

15. The data capture system of claim 12, wherein each of the flexible structure descriptions includes groups of elements, and wherein to process scanned multi-page documents based on each flexible structure description includes:
   identifying instances of groups of elements; and
   removing identified instances of groups of elements from a search area while processing a scanned multi-page document when searching for a next instance of the group of elements so that instances of the same group do not overlap where shapes enclosing group instances may overlap.

16. The data capture system of claim 15, wherein each of the flexible structure descriptions includes groups of elements that form complex rows of elements that are located on more than one line, and wherein a row of elements flows over multiple page images, and wherein to process scanned multi-page documents based on each flexible structure description includes:
   detecting a portion of a same complex row of elements on a following page.

17. The data capture system of claim 12, wherein the multi-page document image includes multi-page document images of a batch of scanned documents, and wherein the method further comprises identifying an individual document based at least in part upon the detected header or failure to detect the last page.

* * * * *